(12) United States Patent
Sun (10) Patent No.: US 12,206,274 B2
(45) Date of Patent: Jan. 21, 2025

(54) POWER REGULATING CIRCUIT, CHARGING DEVICE AND POWER SUPPLY MODE SETTING METHOD THEREOF

(71) Applicant: GIGA-BYTE TECHNOLOGY CO., LTD., New Taipei (TW)

(72) Inventor: Pei-Hua Sun, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 528 days.

(21) Appl. No.: 17/700,093

(22) Filed: Mar. 21, 2022

(65) Prior Publication Data

US 2023/0145769 A1   May 11, 2023

(30) Foreign Application Priority Data

Nov. 10, 2021 (TW) ................................. 110141748

(51) Int. Cl.
*H02J 7/00* (2006.01)

(52) U.S. Cl.
CPC ....... *H02J 7/00712* (2020.01); *H02J 2207/20* (2020.01)

(58) Field of Classification Search
CPC .. H02J 7/00712; H02J 2207/20; H02J 7/0071; H02J 7/00714; H02J 7/00302
USPC ........................................................ 320/137
See application file for complete search history.

(56) References Cited

U.S. PATENT DOCUMENTS

| | | | | | |
|---|---|---|---|---|---|
| 4,609,861 | A | * | 9/1986 | Inaniwa | H02J 7/0071 320/152 |
| 5,777,462 | A | * | 7/1998 | Yue | G05F 1/575 323/284 |
| 7,489,109 | B1 | * | 2/2009 | Qian | H02J 7/007 320/140 |

(Continued)

FOREIGN PATENT DOCUMENTS

| | | | | | |
|---|---|---|---|---|---|
| CN | 104701962 | B | * | 4/2017 | H02J 5/00 |
| CN | 107834844 | A | * | 3/2018 | H02J 7/00 |

(Continued)

OTHER PUBLICATIONS

Japanese Office Action issued in corresponding application No. 2022-076873, dated Aug. 1, 2023.

(Continued)

*Primary Examiner* — M Baye Diao
(74) *Attorney, Agent, or Firm* — Maschoff Brennan (57) ABSTRACT

A power supply mode setting method is provided, with said method including: in a detection time period, controlling the power regulating circuit in a power transmission state, and detecting a charge current to obtain a detected value; determining in which one of a TC range, a CV range and a CC range the detected value locates; adjusting the power regulating circuit to a power off state for a first duration when the detected value is in the TC range; keeping the power regulating circuit in the power transmission state for a second duration when the detected value is in the CV range; and keeping the power regulating circuit in the power transmission state for a third duration when the detected value is in the CC range. A power regulating circuit and a charging device adapting said method are also provided.

7 Claims, 6 Drawing Sheets

(56) References Cited

U.S. PATENT DOCUMENTS

| | | | | |
|---|---|---|---|---|
| 8,427,113 | B2* | 4/2013 | Xing | H02J 7/007182 |
| | | | | 320/140 |
| 8,624,435 | B2* | 1/2014 | Tsai | H02J 9/06 |
| | | | | 307/66 |
| 9,231,417 | B2* | 1/2016 | Watanabe | H02J 7/00304 |
| 9,270,134 | B2* | 2/2016 | Gaddam | H02J 50/80 |
| 10,038,326 | B2* | 7/2018 | Chen | H02J 7/007194 |
| 10,516,284 | B2* | 12/2019 | Maalouf | H02M 3/07 |
| 11,050,289 | B2 | 6/2021 | Tian et al. | |
| 2009/0309547 | A1* | 12/2009 | Nakatsuji | H02J 7/06 |
| | | | | 320/164 |
| 2011/0279079 | A1* | 11/2011 | Do Valle | H02J 7/0071 |
| | | | | 320/162 |
| 2014/0203762 | A1* | 7/2014 | Kato | H02J 7/00711 |
| | | | | 320/107 |
| 2014/0225573 | A1 | 8/2014 | Watanabe | |
| 2015/0137769 | A1* | 5/2015 | Chen | H02J 7/007 |
| | | | | 320/157 |
| 2016/0079789 | A1 | 3/2016 | Kato | |
| 2016/0218531 | A1* | 7/2016 | Li | H02J 7/00308 |
| 2016/0241049 | A1* | 8/2016 | Hung | H02J 7/00712 |
| 2018/0076635 | A1* | 3/2018 | Maalouf | H02J 7/02 |
| 2019/0222038 | A1* | 7/2019 | Chen | H01M 10/0525 |

FOREIGN PATENT DOCUMENTS

| | | | | |
|---|---|---|---|---|
| CN | 113009995 A | | 6/2021 | |
| EP | 3285362 B1 | * | 3/2021 | G01R 31/3842 |
| JP | 2008-043027 A | | 2/2008 | |
| TW | I700577 B | | 8/2020 | |

OTHER PUBLICATIONS

Extended European Search Report dated Sep. 21, 2022 as received in Application No. 22163534.5.

TW Office Action dated Aug. 19, 2022 as received in Application No. 110141748.

* cited by examiner

POWER REGULATING CIRCUIT, CHARGING DEVICE AND POWER SUPPLY MODE SETTING METHOD THEREOF

This non-provisional application claims priority under 35 U.S.C. § 119(a) on Patent Application No. 110141748 filed in Taiwan on Nov. 10, 2021, the entire contents of which are hereby incorporated by reference.

BACKGROUND

1. Technical Field

The present invention relates to a power regulating circuit, a charging device and a power supply mode setting method thereof, and more particularly, to a power regulating circuit, a charging device and a power supply mode setting method thereof capable of avoiding overcharge.

2. Related Art

Traditionally, there are mainly two key sources damaging lithium batteries. One of them is over-discharge, in which lithium batteries gradually discharge with a small current until its voltage is much lower than the standard voltage (usually 3.7 volts), such as lower than 3.0 volts. Over-discharge not only may cause electronic devices applying these lithium batteries to be unable to restart totally, but may also cause permanent damages to the lithium batteries. The other one is overcharge, in which lithium batteries are charged further after they have been fully charged. Overcharge may cause a substantial increase in the number of charge cycles of a lithium battery and thus largely shorten the lifetime of it. If a lithium battery is seriously over-charged, there is a high risk of swelling, deformation, or even explosion in this lithium battery.

Currently, in the computer market, most of the laptops have built-in lithium batteries and are charged through a charger. The charger can usually be a conventional DC adapter or a USB-C charger. In general use, users often just connect the power-on charger to a laptop through a power line, and do further operation about power supplying no more, taking the laptop as a desktop computer namely. Thus, the power line from the power-on charger normally connects with the laptop and provides electrical power to the laptop, even though the lithium battery therein has been fully charged. With the above-mentioned habit, continuously charging a lithium battery for a long time period such as ten days or even one month can greatly reduce the lifetime thereof although overcharge for a short time period may not substantially cause damage to the lithium battery.

Furthermore, most of the conventional laptops have removable lithium batteries with latch design, which can be easily removed when fully charged. However, although a user can remove the lithium battery timely to avoid over-charge, the laptop can be shut down abnormally due to a power outage in the supply mains or an unintentional unplugging of the power line once the lithium battery has been removed, which may damage the laptop in its hardware or software.

SUMMARY

According to an embodiment of the present disclosure, a power supply mode setting method is disclosed and comprises: in a detection time period, controlling the power regulating circuit in a power transmission state, and detecting a charge current to obtain a detected value; determining in which one of a trickle charge (TC) range, a constant voltage (CV) range and a constant current (CC) range the detected value locates; adjusting the power regulating circuit to a power off state for a first duration when the detected value is in the TC range; keeping the power regulating circuit in the power transmission state for a second duration when the detected value is in the CV range; and keeping the power regulating circuit in the power transmission state for a third duration when the detected value is in the CC range, wherein values within the TC range are smaller than values within the CV range, and the values within the CV range are smaller than values within the CC range.

According to another embodiment of the present disclosure, a power regulating circuit is disclosed and comprises: a detecting module detecting a charge current during a detection time period to obtain a detected value; a control module coupled to the detecting module, receiving the detected value, and determining in which one of a trickle charge (TC) range, a constant voltage (CV) range and a constant current (CC) range the detected value locates, wherein values within the TC range are smaller than values within the CV range, and values within the CV range are smaller than values within the CC range; and an actuating module coupled to the control module and receiving commands from the control module to control the power regulating circuit in a power transmission state or a power off state, wherein the control module commands the actuating module in the detection time period to control the power regulating circuit in the power transmission state, adjusts the power regulating circuit to the power off state for a first duration when the detected value is determined as in the TC range by the control module, keeps the power regulating circuit in the power transmission state for a second duration when the detected value is determined as in the CV range by the control module, and keeps the power regulating circuit in the power transmission state for a third duration when the detected value is determined as in the CC range by the control module.

According to yet another embodiment of the present disclosure, a charging device is disclosed and comprises: a transformer module configured to couple to a power source, transform power provided by the power source to a charge current, and output the charge current; and the power regulating circuit as recited above, with the detecting module coupled to the transformer module.

BRIEF DESCRIPTION OF THE DRAWINGS

The invention will become more fully understood from the detailed description given hereinbelow and the accompanying drawings which are given by way of illustration only and thus are not limitative of the invention and wherein.

DETAILED DESCRIPTION

It must be understood that the "electronic devices" with charging systems mentioned in the present invention can be laptops, smart phones, personal digital assistants, navigation equipment, game consoles, tablet computers, or any combination of the above devices, and it is not limited thereto. In the following discussion, for an easy and better understanding, a laptop is taken as the example for the "electronic device(s)".

Figure 1:
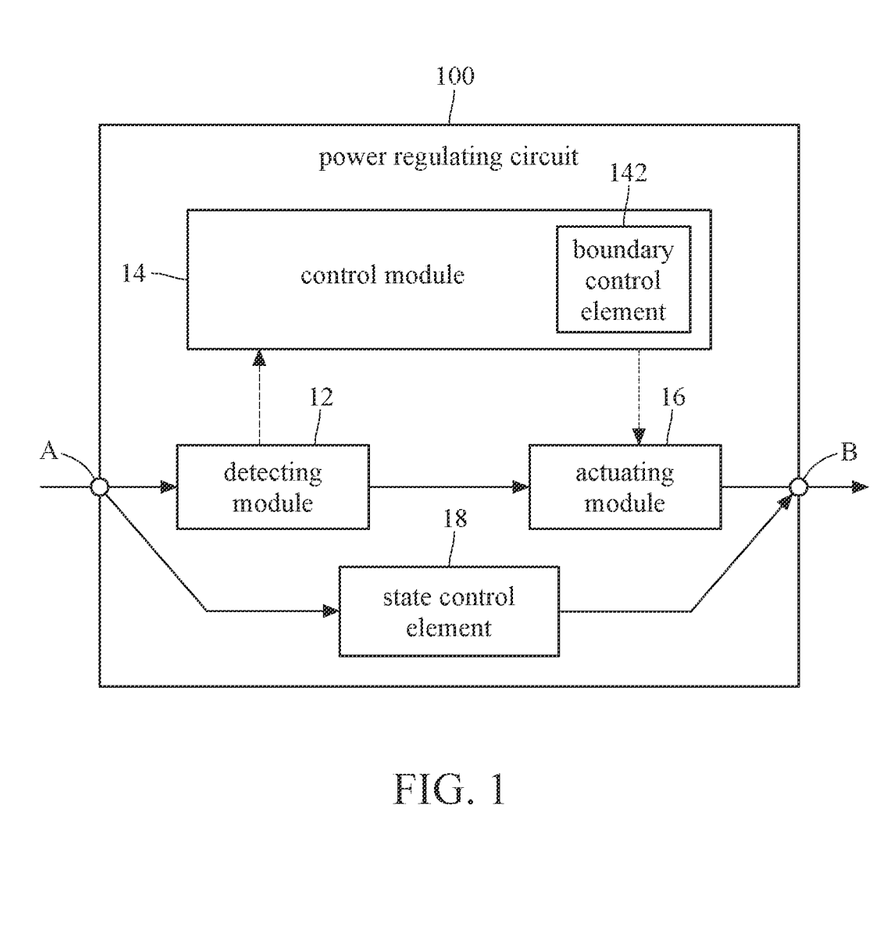
FIG. 1 is a block diagram illustrating a power regulating circuit in accordance with an embodiment of the present disclosure.

Refer to FIG. 1, which is a block diagram illustrating a power regulating circuit in accordance with an embodiment of the present disclosure. In this embodiment, the power regulating circuit 100 includes a detecting module 12, a control module 14 and an actuating module 16. The power regulating circuit 100 further includes a receiving end A and a delivery end B, so that, after the power regulating circuit 100 receives a charge current by the receiving end A, the power regulating circuit 100 may take this charge current as an output power and transmit it to an electronic device via the delivery end B. Moreover, the solid lines in FIG. 1 are adapted to show power transmission paths, and the dashed lines therein are adapted to show signal transmission paths between the detecting module 12 and the control module 14, and between the control module 14 and the actuating module 16.

In an embodiment, during a detection time period, the detecting module 12 can detect a charge current at the receiving end A to obtain a detected value, while the power regulating circuit 100 is in a power transmission state during this detection time period. Said detection time period may have a length in time sufficient for the detecting module 12 to detect the amount of the charge current, such as several milliseconds (ms) or several microseconds (µs), and this disclosure is not limited thereto.

Figure 2A:
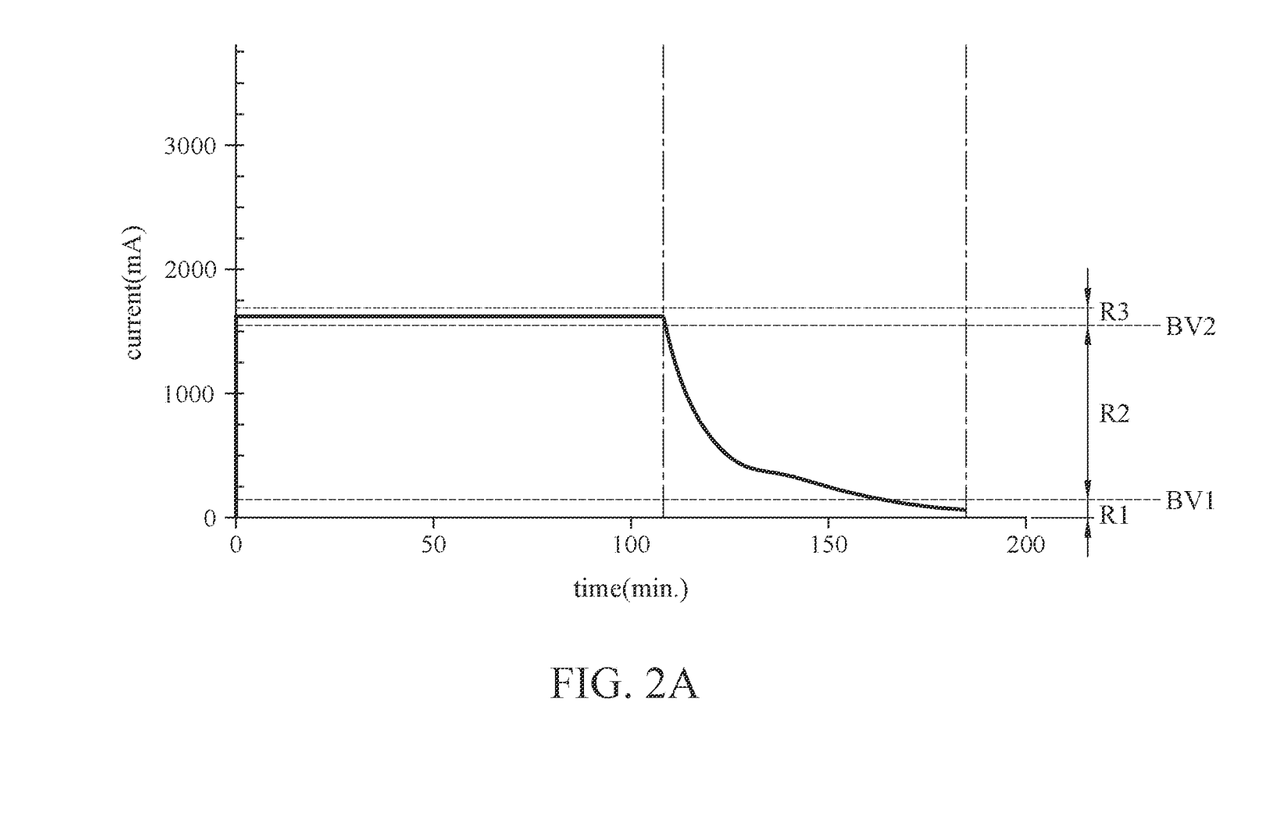
FIG. 2A is a curve diagram illustrating the charging current of a battery of an electronic device to which an embodiment of the present power regulating circuit connects.
Figure 2B:
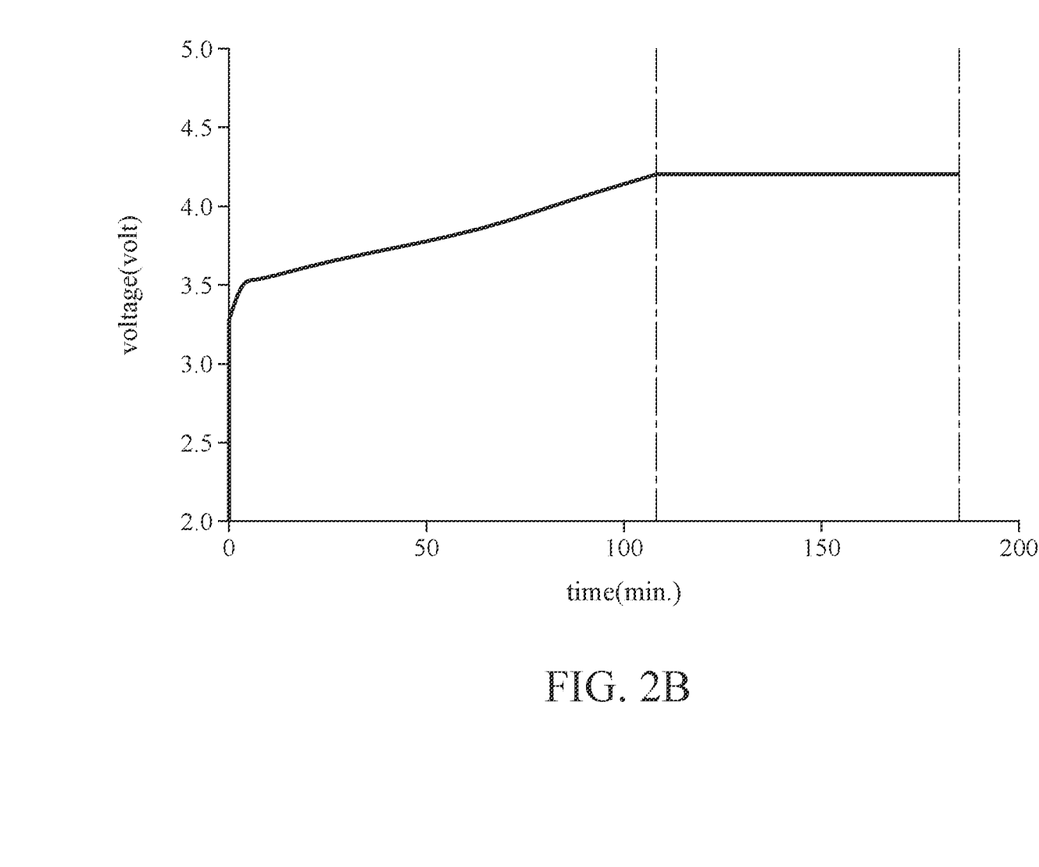
FIG. 2B is a curve diagram illustrating the charging voltage of the battery of the electronic device to which the embodiment of the present power regulating circuit connects.
Figure 2C:
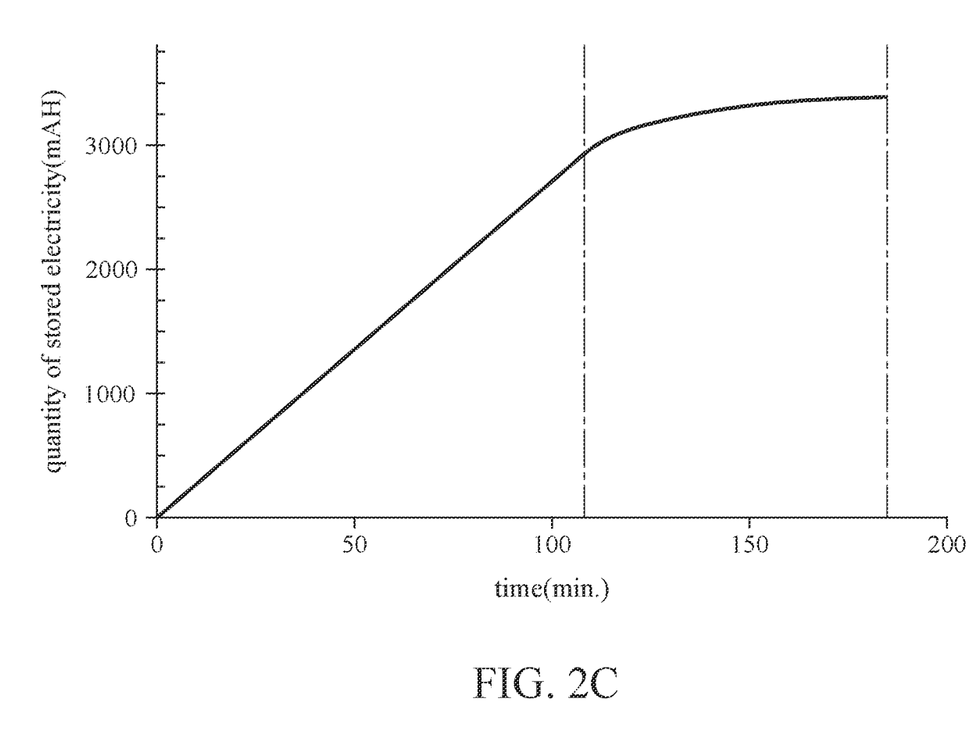
FIG. 2C is a curve diagram illustrating the quantity of stored electricity of the battery of the electronic device to which the embodiment of the present power regulating circuit connects.

In order to clearly explain the control module 14, please refer to FIG. 1 and FIG. 2A to FIG. 2C, wherein FIG. 2A is a curve diagram illustrating the charging current of a battery of an electronic device to which an embodiment of the present power regulating circuit connects, FIG. 2B is a curve diagram illustrating the charging voltage thereof, and FIG. 2C is a curve diagram illustrating the quantity of stored electricity thereof. In an embodiment, the control module 14 may be coupled to the detecting module 12, receive said detected value, and determine in which one of a trickle charge (TC) range R1, a constant voltage (CV) range R2 and a constant current (CC) range R3 as shown in FIG. 2A the detected value locates. In an embodiment, the control module 14 can be implemented by one or more integrated circuits, such as a micro processing unit, a micro control unit, a central processing unit (CPU), or other programmable general-purpose or special-purpose microprocessors, a digital signal processor (DSP), a programmable controller, an application specific integrated circuit (ASIC), or other similar components as examples, or a combination thereof. Namely, the control module 14 is a component capable of performing the calculations discussed in the following at least.

In an operational embodiment of the power regulating circuit 100 of the present disclosure, if the control module 14 determines that said detected value locates in the TC range R1, the control module 14 controls the actuating module 16 in a first actuating mode, in which the transmission of power is prohibited for a first duration, the power regulating circuit 100 staying in a power off state for the first duration namely. Specifically, when a value of the charge current detected at the receiving end A is in the TC range R1, such as that said detected value is less than 0.05 A or almost zero, it means that the receiver of the output power outputted by the delivery end B, the battery of the electronic device in this embodiment, is almost fully charged. In order to prevent the battery of the electronic device from overcharge, the control module 14 enters the first actuating mode to control the actuating module 16 to be open, so as to stop the output power at the delivery end B. Since the electronic device is powered by the battery during the first duration, this first duration is preferably set according to the capacity of the battery, such as 2 hours.

In an embodiment, if the control module 14 determines that said detected value locates in the CV range R2, the control module 14 controls the actuating module 16 in a second actuating mode, in which the transmission of power is kept for a second duration, the power regulating circuit 100 staying in the power transmission state for the second duration namely. Specifically, when the value of the charge current detected at the receiving end A is in the CV range R2, such as that said detected value is between 0.05 A and 1.5 A, it means that the receiver of the output power outputted by the delivery end B has stored a certain amount of electricity, such as 50%-90% of the capacitance of the battery. Since a charging system of the electronic device charges the battery by the constant voltage mode so as to enter the trickle charge mode after a period of time, this second duration is also preferably set according to the capacity of the battery, such as 0.5 hour.

In an embodiment, if the control module 14 determines that said detected value locates in the CC range R3, the control module 14 controls the actuating module 16 in a third actuating mode, in which the transmission of power is kept for a third duration, the power regulating circuit 100 staying in the power transmission state for the third duration namely. Specifically, when the value of the charge current detected at the receiving end A is in the CC range R3, such as that said detected value is larger than 1.5 A, it means that the receiver of the output power outputted by the delivery end B is about to be exhausted or has low electricity therein. Since a charging system of the electronic device charges the battery by the constant current mode so as to enter the constant voltage mode after a period of time and thus to avoid battery exhaustion, this third duration is also preferably set according to the capacity of the battery, such as 1 hour.

In addition to setting the lengths of the first to third durations depending on demands, the control module 14 can also set the boundary values between adjacent two of the TC range R1, the CV range R2, and the CC range R3 according to the demands. Specially, the control module 14 may include a boundary control element 142 for setting the value of a first boundary value BV1 between the TC range R1 and the CV range R2 and the value of a second boundary value BV2 between the CV value range R2 and the CC range R3 according to the battery characteristics. Therefore, the first boundary value BV1 and the second boundary value BV2 can be set before the control module 14 obtaining the detected value and determining in which range the detected value locates. The boundary control element 142 may be a physical switch that implemented by a multi-section DIP switch or a slide switch for carrying out the setting of the two boundary values BV1 and BV2. Alternatively, the boundary control element 142 may be a virtual switch implemented by a communication element and a software operating interface. The communication element can be such as a device of radio frequency identification (RFID), near field communication (NFC) or Bluetooth. As a result, the power regulating circuit 100 of the present disclosure can be applied to batteries with different specifications and characteristics and still provides a sufficient protection against over-discharge or overcharge.

After the control module 14 completes the content of the first, second or third actuating mode, controlling the actuating module 16 to prohibit the transmission of power for the first duration, to keep the transmission of power for the second duration or to keep the transmission of power for the third duration namely, the control module 14 may perform a next round of power supply mode setting. Specially, after the control module 14 completes the content of the first, second or third actuating mode, the control module 14 may control the detecting module 12 again to obtain a new detected value of the charge current within a next detection time period, and determine which mode should be used to control the actuating module 16 based on this new detected value.

In an embodiment, the actuating module 16 may include an electronic switch (not shown), and the electronic switch may be MOSFET, transistor, relay, DEPFET, DGMOFET, FREDFET, HEMT, IGBT, NOMFET, MODFET, OFET, or a combination of the above-mentioned elements. In this embodiment, the actuating module 16 couples to the control module 14 and may control whether the power regulating circuit 100 outputs power or not according to the commands of the control module 14; that is, the operation of the actuating module 16 decides the power regulating circuit 100 to be in the power transmission state or the power off state. Particularly, when the actuating module 16 is implemented by a transistor, the command of the control module 14 controls the actuating module 16 to work in the saturation region or cutoff region.

In an embodiment, the power regulating circuit 100 of the present disclosure may further include a state control element 18 coupled between the receiving end A and the delivery end B, so that the series circuit including the detecting module 12, the control module 14 and the actuating module 16 is parallel to the state control element 18. This state control element 18 is adapted for setting whether the command of the control module 14 may actually determine the state of the power regulating circuit 100. For example, the state control element 18 may be a toggle switch in order to provide a short circuit between the receiving end A and the delivery end B, so that the power regulating circuit 100 can be in the power transmission state even though the control module 14 does not send any command to the actuating module 16.

Figure 3:
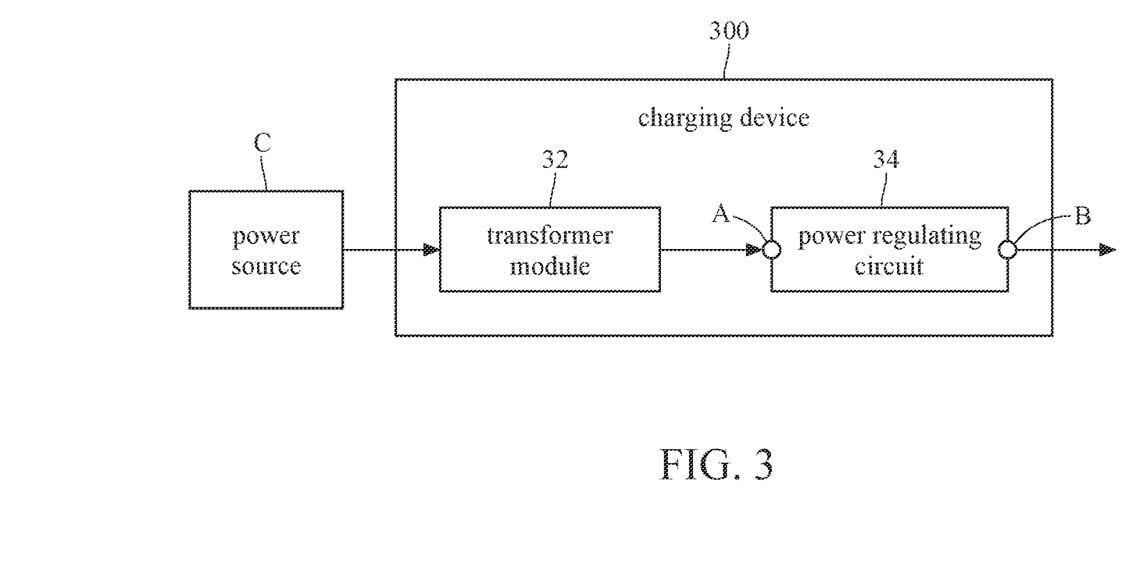
FIG. 3 is a block diagram illustrating a charging device in accordance with an embodiment of the present disclosure.

Referring to FIG. 3, a block diagram illustrating a charging device in accordance with an embodiment of the present disclosure is shown. In the embodiment, a charging device 300 including a transformer module 32 and a power regulating circuit 34 is shown, wherein the power regulating circuit 34 may be implemented by the power regulating circuit 100 shown in FIG. 1, and the transformer module 32 is coupled to a detecting module (not shown) of the power regulating circuit 34. In an embodiment, the transformer module 32 is configured to couple with a power source C, and may convert the power provided by the power source C into the charge current received by the receiving end A of the power regulating circuit 34. For example, the power source C may be an AC power of 100-240 volts, and the transformer module 32 may convert said AC power to a DC power of 5-24 volts to serve as the charge current received by the receiving end A. However, the present disclosure does not thus limit to the values of the above AC power and DC power.

Figure 4:
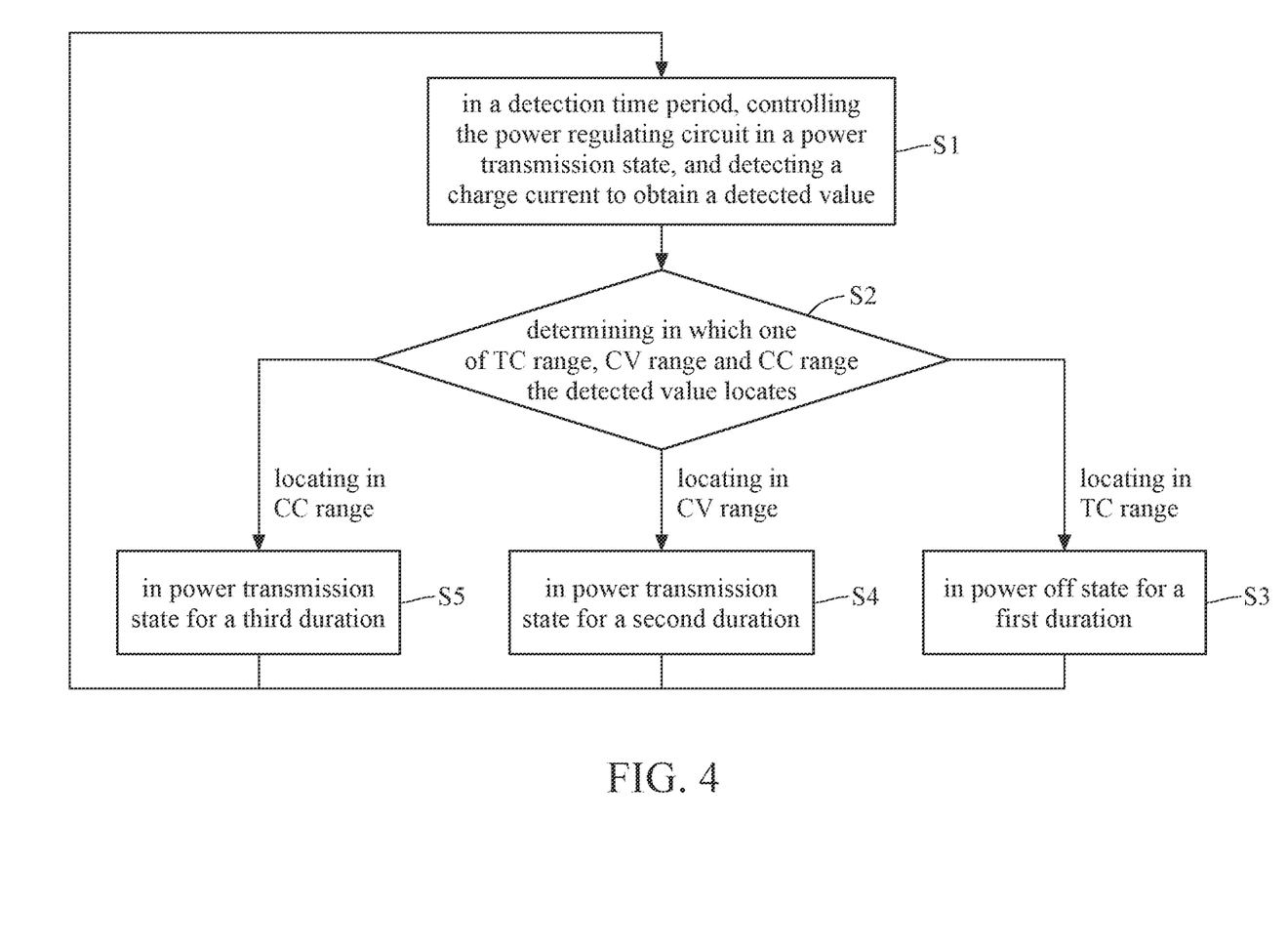
FIG. 4 is a flowchart illustrating a power supply mode setting method in accordance with an embodiment of the present disclosure.

Please refer to FIG. 4, which is a flowchart illustrating a power supply mode setting method in accordance with an embodiment of the present disclosure. In Step S1, in the detection time period, the power regulating circuit 100 is in the power transmission state, and a charge current is detected and thus a detected value related to the charge current is thus obtained. Specially, in an embodiment, the control module 14 may control the actuating module 16 to be turned on in the detection time period, and the detecting module 12 may thus obtain the detected value corresponding to the charge current.

In Step S2, the control module 14 determines in which one of the TC range, the CV range and the CC range the detected value locates, while values within the TC range are smaller than values within the CV range, and the values within the CV range are smaller than values within the CC range (as shown in FIG. 2A).

If the detected value is in the TC range R1, Step S3 is performed. In Step S3, the control module 14 controls the actuating module 16 in a first actuating mode, in which the transmission of power is prohibited for a first duration, the power regulating circuit 100 staying in a power off state for the first duration namely. Since the battery of the electronic device is almost fully charged, the first duration is less than the time period required for the battery of the electronic device to fall from saturation to exhaustion in normal use. For example, if the electronic device is a notebook computer with a charging specification of "CC-CV 0.5 C(max) 4.20V, 65 mA cut-off at 25° C.", the first duration may be about 2 hours.

If the detected value is in the CV range R2, Step S4 is performed. In Step S4, the control module 14 controls the actuating module 16 in a second actuating mode, in which the transmission of power is kept for a second duration, the power regulating circuit 100 staying in the power transmission state for the second duration namely. Since the battery of the electronic device has stored a certain amount of electricity, the second duration is the time required for the battery of the electronic device to rise from this certain amount of electricity (such as about 60% of capacitance of the battery) to saturation, and the second duration is usually less than the first duration. For example, if the electronic device is the notebook computer with the above-mentioned charging specification, the above-mentioned second duration may be about 0.5 hour.

If the detected value is in the CC range R3, Step S5 is performed. In Step S5, the control module 14 controls the actuating module 16 in a third actuating mode, in which the transmission of power is kept for a third duration, the power regulating circuit 100 staying in the power transmission state for the third duration namely. Since the battery of the electronic device may be close to exhaustion or have really low electricity, the third duration is less than the time required for the battery of the electronic device to rise from exhaustion to saturation in normal use. Usually, the third duration is less than the first duration, but greater than the second duration. For example, if the electronic device is the notebook computer with the above-mentioned charging specification, the third duration may be about 1 hour.

Furthermore, as illustrated in FIG. 4, after any one of Steps S3 to S5 is completed, Step S1 can be performed again to decide whether it is proper to further supply power to the electronic device based on the present stored electricity of the battery. In addition, before Step S1 is executed, a command can be received in advance to set the first boundary value BV1 between the TC range R1 and the CV range R2, and to set the second boundary value BV2 between the CV range R2 and the CC range R3 in order to meet the requirements of different kinds of batteries.

With the above embodiments of the power regulating circuit, charging device and power supply mode setting method of the present disclose, the output power may be controlled in accordance with the detected charge current. Namely, when the battery of the electronic device is charged via the embodiments of the disclosed device and method, the user need not to change any usage habit to prevent the battery from overcharge, over-discharge, or other problems due to power charging.

What is claimed is:

1. A power supply mode setting method, adapted to a power regulating circuit, comprising:
   in a detection time period, controlling the power regulating circuit in a power transmission state, and detecting a charge current to obtain a detected value;
   determining in which one of a trickle charge (TC) range, a constant voltage (CV) range and a constant current (CC) range the detected value locates;
   adjusting the power regulating circuit to a power off state for a first duration when the detected value is in the TC range;
   keeping the power regulating circuit in the power transmission state for a second duration when the detected value is in the CV range; and
   keeping the power regulating circuit in the power transmission state for a third duration when the detected value is in the CC range;
   wherein values within the TC range are smaller than values within the CV range, and the values within the CV range are smaller than values within the CC range.

2. The power supply mode setting method according to claim 1, wherein the first duration is larger than the third duration; and the third duration is larger than the second duration.

3. The power supply mode setting method according to claim 1, wherein, before determining in which one of the TC range, the CV range and the CC range the detected value locates, receiving a command setting a first boundary value between the TC range and the CV range and a second boundary value between the CV range and the CC range.

4. A power regulating circuit comprising:
   a detecting module detecting a charge current during a detection time period to obtain a detected value;
   a control module coupled to the detecting module, receiving the detected value, and determining in which one of a trickle charge (TC) range, a constant voltage (CV) range and a constant current (CC) range the detected value locates, wherein values within the TC range are smaller than values within the CV range, and values within the CV range are smaller than values within the CC range; and
   an actuating module coupled to the control module and receiving commands from the control module to control the power regulating circuit in a power transmission state or a power off state;
   wherein the control module commands the actuating module in the detection time period to control the power regulating circuit in the power transmission state, adjusts the power regulating circuit to the power off state for a first duration when the detected value is determined as in the TC range by the control module, keeps the power regulating circuit in the power transmission state for a second duration when the detected value is determined as in the CV range by the control module, and keeps the power regulating circuit in the power transmission state for a third duration when the detected value is determined as in the CC range by the control module.

5. The power regulating circuit according to claim 4, wherein the first duration is larger than the third duration, and the third duration is larger than the second duration.

6. The power regulating circuit according to claim 4, wherein the detecting module, the control module and the actuating module are connected between a receiving end and a delivery end, and the power regulating circuit further comprising a state control element connected between the receiving end and the delivery end to provide a short circuit between the receiving end and the delivery end selectively.

7. A charging device comprising:
   a transformer module configured to couple to a power source, transform power provided by the power source to a charge current, and output the charge current; and
   the power regulating circuit according to claim 4, with the detecting module coupled to the transformer module.

* * * * *